United States Patent
Erden et al.

(10) Patent No.: US 8,922,947 B2
(45) Date of Patent: Dec. 30, 2014

(54) TWO DIMENSIONAL MAGNETIC SENSOR IMMUNE TO SKEW ANGLE MISALIGNMENT

(71) Applicant: Seagate Technology LLC, Cupertino, CA (US)

(72) Inventors: Mehmet Fatih Erden, St. Louis Park, MN (US); Jason Gadbois, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/261,581

(22) Filed: Apr. 25, 2014

(65) Prior Publication Data

US 2014/0233134 A1  Aug. 21, 2014

Related U.S. Application Data

(63) Continuation of application No. 13/458,700, filed on Apr. 27, 2012, now Pat. No. 8,711,517.

(51) Int. Cl.
| | |
|---|---|
| *G11B 5/39* | (2006.01) |
| *G11B 5/60* | (2006.01) |
| *G11B 5/29* | (2006.01) |
| *G11B 5/48* | (2006.01) |
| *G11B 5/55* | (2006.01) |
| *G11B 5/596* | (2006.01) |
| *G11B 5/49* | (2006.01) |

(52) U.S. Cl.
CPC ............ *G11B 5/4813* (2013.01); *G11B 5/5552* (2013.01); *G11B 5/5582* (2013.01); *G11B 5/596* (2013.01); *G11B 5/29* (2013.01); *G11B 5/3977* (2013.01); *G11B 5/4886* (2013.01); *G11B 5/4976* (2013.01); *G11B 5/4826* (2013.01)
USPC .......................... 360/121; 360/234.7; 360/316

(58) Field of Classification Search
USPC ............... 360/121, 316, 234.7, 235.4, 245.1
See application file for complete search history.

(56) References Cited

U.S. PATENT DOCUMENTS

| | | | |
|---|---|---|---|
| 4,575,775 | A | 3/1986 | Albrecht |
| 5,448,539 | A | 9/1995 | Kamioka |
| 6,081,402 | A | 6/2000 | Cho |
| 6,104,562 | A | 8/2000 | Ottesen et al. |
| 6,381,210 | B1 | 4/2002 | Alon et al. |
| 6,674,618 | B2 | 1/2004 | Engel et al. |
| 6,826,140 | B2 | 11/2004 | Brommer et al. |
| 6,977,970 | B2 | 12/2005 | Shim et al. |
| 7,012,786 | B2 | 3/2006 | Nakamikawa |
| 7,054,114 | B2 | 5/2006 | Jander et al. |
| 7,116,514 | B2 * | 10/2006 | Mahnad et al. ............ 360/77.12 |
| 7,126,890 | B2 | 10/2006 | Learned et al. |
| 7,259,927 | B2 | 8/2007 | Harris |
| 7,271,970 | B2 | 9/2007 | Tsuchiya |
| 7,436,632 | B2 | 10/2008 | Li et al. |
| 7,508,619 | B2 | 3/2009 | Okamoto et al. |
| 7,564,656 | B2 | 7/2009 | Gurney et al. |
| 7,567,397 | B2 | 7/2009 | Lu |

(Continued)

*Primary Examiner* — Jefferson Evans
(74) *Attorney, Agent, or Firm* — Hall Estill Attorneys at Law

(57) ABSTRACT

Apparatus for two dimensional data reading. In accordance with some embodiments, a magnetic read element has a plurality of read sensors positioned symmetrically about a pivot point with at least two of the read sensors configured to concurrently read two dimensional user data while being immune to skew angle misalignment.

20 Claims, 4 Drawing Sheets

(56) References Cited

U.S. PATENT DOCUMENTS

| | | |
|---|---|---|
| 7,636,219 B2 | 12/2009 | Ikegami et al. |
| 7,760,465 B2 | 7/2010 | Koeppe |
| 7,813,066 B2 | 10/2010 | Nakagawa et al. |
| 7,936,175 B2 | 5/2011 | Kirkelund et al. |
| 8,139,301 B1 | 3/2012 | Li et al. |
| 8,310,782 B2 | 11/2012 | Song et al. |
| 8,390,948 B2 | 3/2013 | Hogg |
| 2004/0080872 A1 | 4/2004 | Sato et al. |
| 2005/0036437 A1 | 2/2005 | Learned et al. |
| 2005/0134990 A1* | 6/2005 | Tsuchiya ................. 360/63 |
| 2006/0028772 A1* | 2/2006 | Raastad ................. 360/315 |
| 2007/0019335 A1 | 1/2007 | McFadyen |
| 2010/0309583 A1* | 12/2010 | Saliba et al. ............. 360/134 |
| 2011/0199701 A1 | 8/2011 | Bui et al. |
| 2012/0327532 A1* | 12/2012 | Biskeborn et al. ........... 360/75 |
| 2013/0286511 A1* | 10/2013 | Edelman et al. .......... 360/234.3 |

* cited by examiner

TWO DIMENSIONAL MAGNETIC SENSOR IMMUNE TO SKEW ANGLE MISALIGNMENT

RELATED APPLICATION

This application is a continuation of copending U.S. patent application Ser. No. 13/459,700 filed on Apr. 27, 2012 and issuing as U.S. Pat. No. 8,711,517 on Apr. 20, 2014.

SUMMARY

Various embodiments of the present disclosure are generally directed to a magnetic sensor that is capable of two dimensional data sensing.

In accordance with various embodiments, a magnetic read element can be constructed with a plurality of read sensors positioned symmetrically about a pivot point with at least two of the read sensors configured to concurrently read two dimensional user data while being immune to skew angle misalignment.

DETAILED DESCRIPTION

Modern data storage devices have diligently advanced towards higher data capacity, faster data access, and reduced form factors. At least two of these three goals are enabled through technologies which increase areal density, such as heat assisted magnetic recording (HAMR) and bit patterned media (BPM). Due to the present level of maturity of HAMR and BPM, alternative and complementary technologies have been advanced that can be quickly implemented in data storage devices to increase areal data bit density. One such technology is the use of two dimensional magnetic recording (TDMR), which employs multiple dimension encoding of data that are subsequently decoded and processing multiple data tracks.

In addition to increasing areal density, TDMR may provide increased readback datarate with a reduced channel buffer if data from the multiple data tracks are read concurrently. However, the configuration of a transducing element capable of reading multiple data tracks simultaneously can be plagued by skew angle induced track misalignment at various skew angles, especially with devices employing reduced data track widths. Such track misalignment can be mitigated by conducting multiple passes of neighboring data tracks with a single read sensor at a detriment to device performance. Hence, industry demand is pushing for a transducing element with multiple read sensors capable of concurrently reading data from multiple data tracks while being immune from skew angle misalignment.

Accordingly, a plurality of read sensors can be positioned symmetrically about a pivot point with at least two read sensors configured to concurrently read two dimensional user data regardless of skew angle. The symmetrical positioning of the read sensors in relation to the pivot point allows the read sensors to align with adjacent data tracks throughout a data media surface by rotating about the pivot point. The read sensor configuration can further be compactly constructed and scaled to different areal density data media to accommodate a variety of data storage environments.

Figure 1:
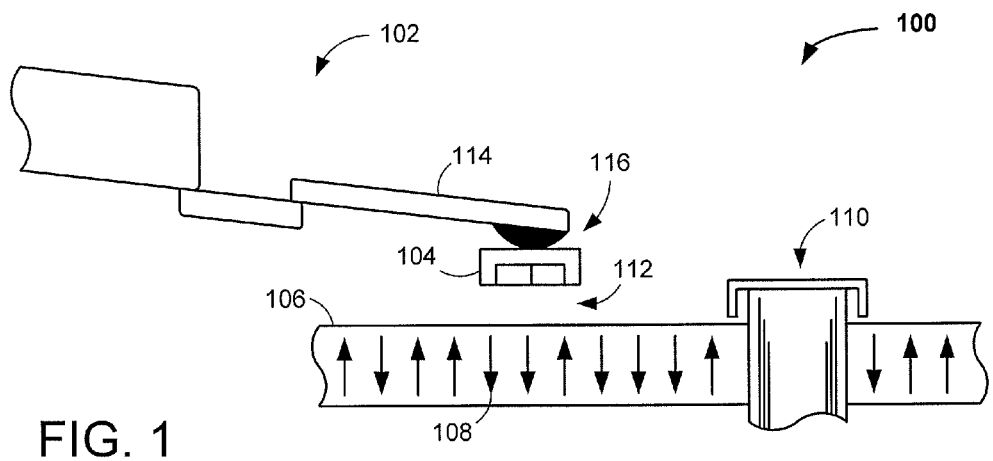
FIG. 1 is a block representation of an example portion of a data storage device.

FIG. 1 generally illustrates an example data transducing portion 100 of a data storage device that may utilize multiple data sensors to read and write data simultaneously or independently. The transducing portion 100 is shown in an environment in which various embodiments of the present technology can be practiced. It will be understood, however, that the various embodiments of this disclosure are not so limited by such environment and can be implemented in a variety of different data storage conditions.

The transducing portion 100 has an actuating assembly 102 that positions a transducing head 104 over programmed data bits 106 present on a magnetic storage media 108. The storage media 108 is attached to a spindle motor 110 that rotates during use to produce an air bearing surface (ABS) 112 on which a slider portion 114 of the actuating assembly 102 flies to position a head gimbal assembly (HGA) 116, which includes the transducing head 104, over a desired portion of the media 108.

The transducing head 104 can include one or more transducing elements, such as a magnetic writer and magnetically responsive reader, which operate to program and read data from the storage media 108, respectively. In this way, controlled motion of the actuating assembly 102 induces the transducers to align with data tracks (not shown) defined on the storage media surfaces to write, read, and rewrite data.

Figure 2:
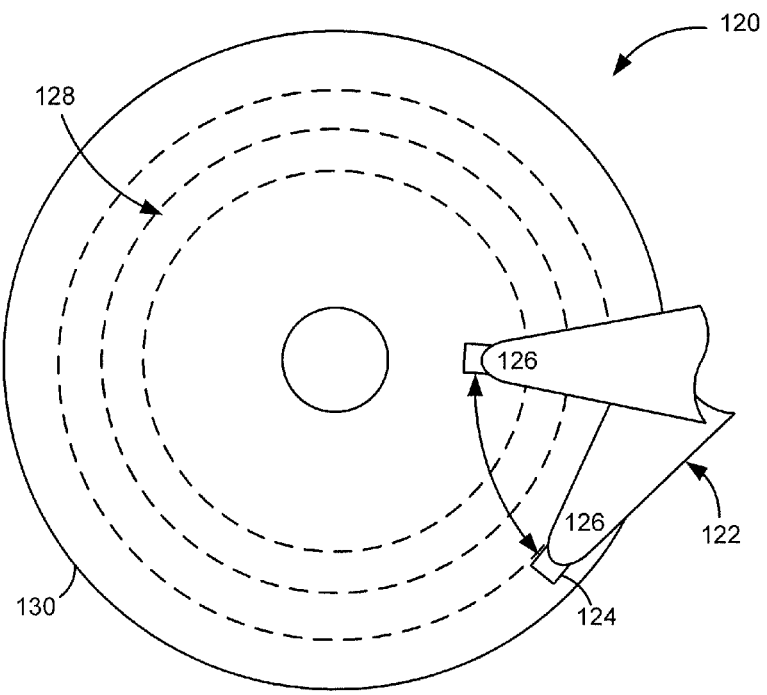
FIG. 2 provides a top view block representation of a portion of an example data storage device.

FIG. 2 displays a top view block representation of a data transducing assembly 120 cable of being used in the data storage device 100 of FIG. 1. An actuating portion 122 of the data transducing assembly 120 has at least a slider 124 and load beam 126 that translate to access various data tracks 128 of a data storage media 130. As shown, rotation of the actuating portion 122 modifies the angular orientation of the slider 124 in relation to the data tracks 128 in what can be called the skew angle of the portion 122.

In TDMR, multiple data transducers access adjacent data tracks to obtain data that is processed jointly to increase areal data bit density. However, simply constructing and operating a transducing assembly 120 with any arbitrary configuration of multiple data transducing elements does not guarantee align with adjacent data tracks for all ranges of skew angles. For example, configuring a transducing assembly 120 with a pivot point oriented on a data transducer can provide data track alignment at zero skew angle, but may be susceptible to inter-track interference and misalignment with data tracks at high skew angles, like −/+14°, due at least in part to separate shield structure.

While some slider 124 angular variation may be accommodated by data processing, the trend of increasing data bit density with decreased track pitch, which is the width of each non-overlapping track such as 50 nm, can position a slider 124 with multiple transducing elements in inefficient positions to read and write data as skew angle changes, especially in two dimensional magnetic recording. Hence, constructing a slider 124 with multiple data transducing elements as small as possible and symmetrically about a pivot point can allow for data track alignment in reduced data track, high data bit density, environments with increased immunity to skew angle induced misalignment.

Figure 3:
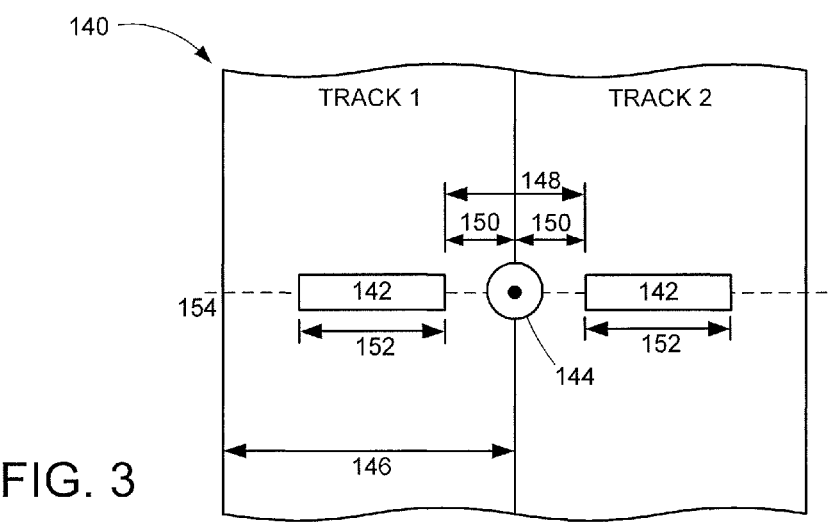
FIG. 3 shows a block representation of a portion of an example data sensor constructed and operated in accordance with various embodiments.

FIG. 3 shows a top view block representation of a portion of a data element 140 capable of being used in the data transducing assembly 120 of FIG. 2 and the data storage device 100 of FIG. 1 to provide two dimensional data recording. The data element 140 has a pair of read sensors 142 positioned symmetrically about a pivot point 144 that serves as the center of rotation for the data element 140. Such read sensor 142 configuration about a centralized pivot point 144 can allow for simultaneous active use of both read sensors 142 at any skew angle to access data bits on different data tracks.

The symmetric orientation of the read sensors 142 about the pivot point 144 can allow for a variety of non-limiting configurations to accommodate concurrent access to multiple data tracks irrespective of the data track pitch 146 and sensor 120 angular orientations. Some embodiments configure the distance 148 between the read sensors 142 as approximately half of the track pitch 146, which corresponds to distance 150 from each read sensor 142 to the pivot point 144 as being approximately one quarter of the track pitch 146. Other embodiments can further configure one, or both, read sensors 142 with a longitudinal length 152 that is approximately half the track pitch 142.

The read sensor 142 and pivot point 144 configuration of FIG. 3 can align multiple sensors to concurrently access multiple data tracks, with the sensors being implemented at the same lateral level of the data element 140. That is, positioning the read sensors 142 along a common axis 154 can allow for efficient construction of data element 140 with shared magnetic features and process controls, such as magnetic shields due to fabrication of a single sensor layer as opposed to stacked layers.

Figure 4:
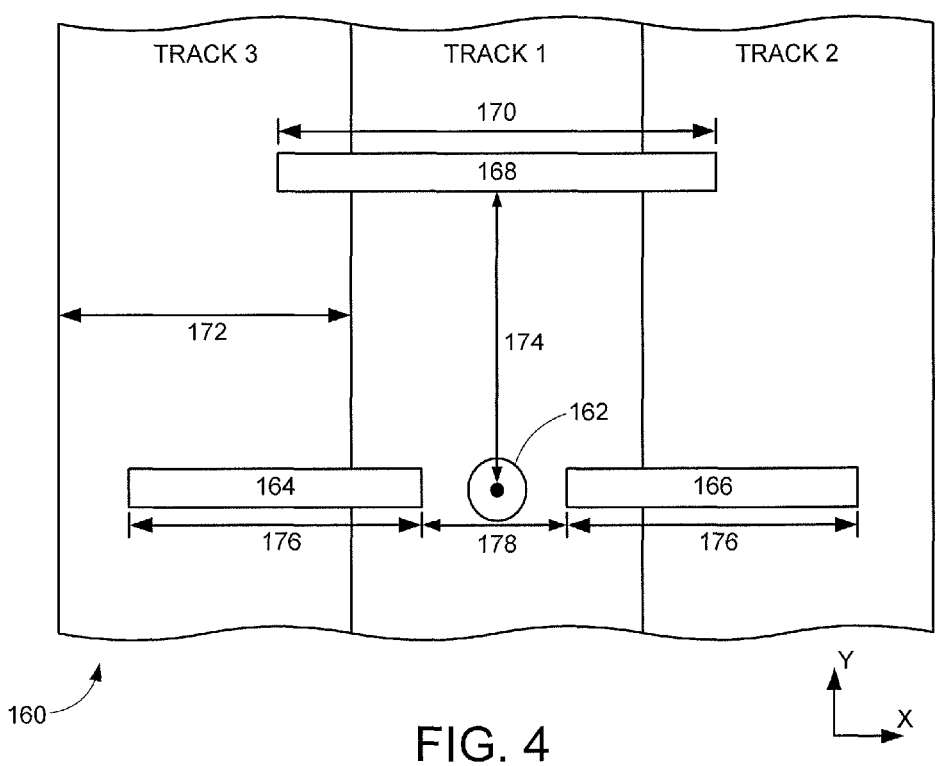
FIG. 4 displays a block representation of a portion of an example data sensor constructed and operated in accordance with various embodiments.

The symmetrical positioning of read sensors 142 about a pivot point 144 can further be extended to concurrently read data from three adjacent, but different, data tracks, as generally illustrated in the block representation of a portion of an example data element 160 of FIG. 4. A pivot point 162 serves as a center of rotation for first 164, second 166, and third 168 read sensors that allows for data track alignment for a wide variety of skew angles.

The introduction of the third read sensor 168 can allow for down track, along the Y axis, data bit reading that can complement the cross-track, along the X axis, data bit reading provided by the first and second read sensors 164 and 166 to improve two dimensional resolution. The addition of the third read sensor 168 downtrack from the pivot point 162 allows for an increased reader width 170, such as 75 nm, that continuously spans beyond a track width 172, such as 50 nm, to simultaneously receive data signals from three adjacent data tracks, which can aid in resolving inter-track interference and increasing sensing accuracy of the first and second read sensors 164 and 166.

The downtrack distance 174 of the third read sensor 168 from the pivot point 162 can be adjusted to provide both symmetrical and non-symmetrical configurations capable of use in various data storage environments. That is, the third read sensor 168 can be configured at a predetermined downtrack distance 174 that corresponds to a read sensor width 176 that is smaller than the data track width 172 while keeping data sensing accuracy due at least in part to the increased width 170 of the third read sensor 168.

The increased width 170 of the third read sensor 168 can further allow the first and second read sensors 164 and 166 to be positioned farther apart, as shown by distance 178, which can allow for more space for various magnetic and electrical components, such as shielding and contacts, on the data element 160. It should be noted that the size and orientation of the read sensors 164, 166, and 168 are not limited to that shown in FIG. 4 and some or all of the sensors can be configured to provide symmetry about the pivot point 162 along single and multiple axis.

Figure 5:
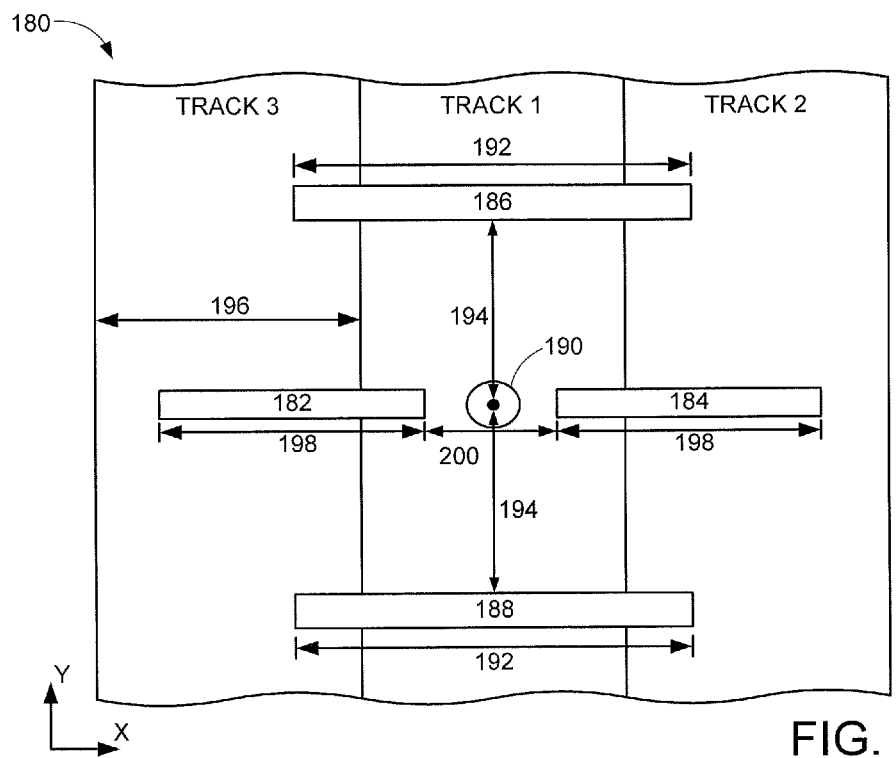
FIG. 5 provides a block representation of a portion of an example data sensor constructed and operated in accordance with various embodiments.

With the capability of tuning the read sensors 164, 166, and 168, the physical size of the data element 160 can be controlled to accommodate a variety of data storage device form factors. However, precisely constructing the size and location of the third read sensor 168 on a different sensor layer as the first and second read sensors 164 and 166 can be an issue. FIG. 5 displays a block representation of a portion of an example data element 180 that employs four read sensors 182, 184, 186, and 188 positioned symmetrically about a pivot point 190.

Configuring the data element 180 with symmetry along both the X and Y axis with respect to the pivot point 190 allows for process and position variations in read sensor fabrication due to redundant downtrack/uptrack read sensors 186 and 188 that allow for fabrication variation without affecting cross-track data resolution. While the third and fourth read sensors 186 and 188 are shown with common first widths 192 and distances from the pivot point 194, either read sensor can be sized and positioned uniquely to provide increased data sensing accuracy and data track alignment, especially at extreme skew angles.

In some embodiments, the third and fourth read sensors 186 and 188 are sized to substantially match twice a data track pitch 196, such as 100 nm width for a 50 nm single data track pitch. Various embodiments can also offset the third and fourth read sensors 186 and 188 to one side of the pivot point 190 so that the first and second read sensors 182 and 184 are symmetrical about the pivot point 190 while the third and fourth read sensors 186 and 188 are symmetrical about the Y axis, but not the pivot point 190.

The various read sensor size and position configurations with respect to the pivot point 190 can be tuned to ensure accurate data bit sensing concurrently from three separate adjacent data tracks while accommodating data track alignment over a wide range of skew angles. Although the inclusion of a fourth read sensor may add layers and physical size to the data element 190, the balanced use of four read sensors can allow the first and second read sensors 182 and 184 to have a reduced cross-track dimension 198, such as 37.5 nm, and increased separation distance 200, such as 50 nm to match the data track pitch 196, that may increase cross-track data bit resolution.

Figure 6:
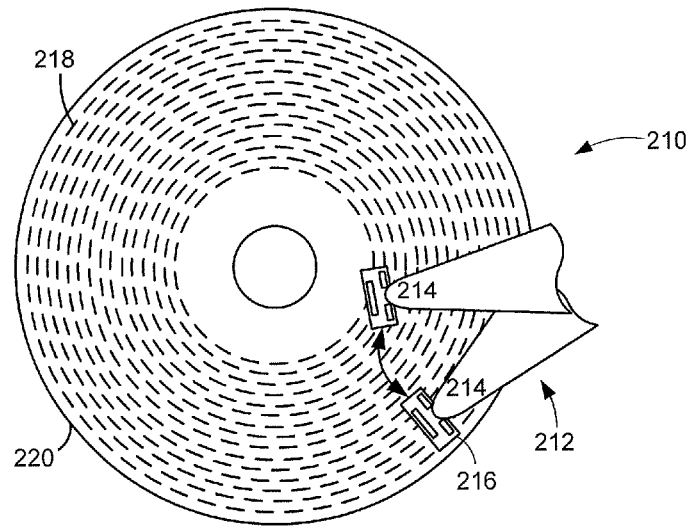
FIG. 6 generally illustrates a top view block representation of a portion of an example data storage device.

FIG. 6 generally illustrates a top block representation of an example data storage device constructed in accordance with various embodiments to conduct TDMR. Regardless of the number and size of data sensors used, a transducing assembly 212 can have a load beam 214 cantilevered to position an air bearing slider 216 over predetermined portions, such as multiple data tracks 218, of a data storage media 220.

Configuring the air bearing slider to connect to the load beam 214 via a pivot point symmetrically positioned about multiple data sensors, such as the sensor configurations of FIGS. 3-5, allows the slider 216 to rotate and align the data sensors to one or more data tracks 218 regardless of whether the transduced data bits are at the inner or outer diameter of the data media. Such positioning can allow for the concurrent reading of exclusively user or servo data from different portions of the data tracks 218.

As a non-limiting example, the transducing assembly 212 can position the air bearing slider 216 so that the pivot point bisects a data track or lies over the boundary between data tracks. Such pivot point positioning can allow the transducing assembly 212 to be immune to skew angle misalignment due to the position of the pivot point in relation to the data tracks.

Figure 7:
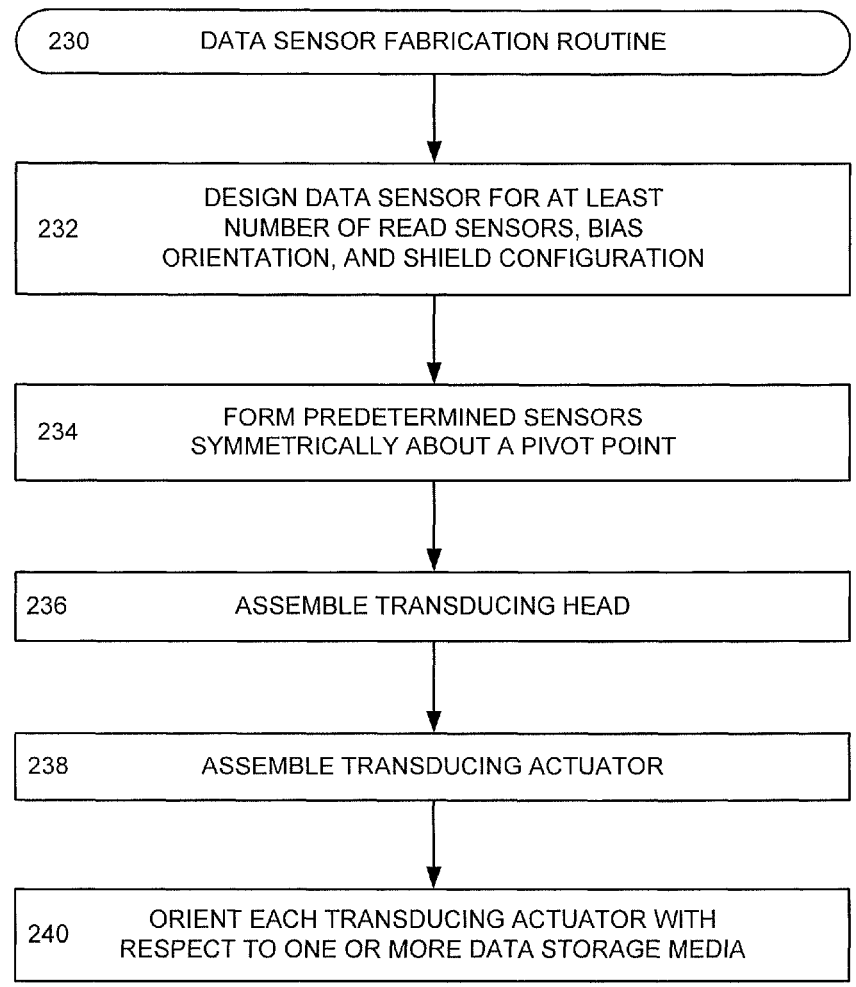
FIG. 7 is a flowchart of a data sensor fabrication routine conducted in accordance with various embodiments.

FIG. 7 provides an example data element fabrication routine 230 performed in accordance with various embodiments. Initially, the routine 230 evaluates a number of non-limiting design choices regarding the structure and operation of the data element in step 232. The evaluation can include at least the number of read sensors to be built as well as the size and orientation of the read sensors in relation to a pivot point. As displayed in FIGS. 3-5, a data element can be constructed in a variety of configurations that allow for efficient construction and accurate sensing of data bits on different data tracks with increased immunity to skew angle induced misalignment.

With that, step 232 chooses data sensor configurations tuned to predetermined data storage device characteristics, such as data bit density and data transfer rates. Step 234 then forms the chosen number of data read sensors, which may be conducted as the deposition of a one or more laminations positioned about a centralized pivot point. Various embodiments form the data sensors as a common continuous layer that is separated and magnetically isolated by magnetic shielding. Other embodiments use a plurality of different layers to position the data sensors at different downtrack positions.

Subsequently in step 236, the data sensors constructed in step 234 are assembled into a transducing head, which may involve forming one or more electrical and physical connections that allow for data bit sensing from multiple adjacent data tracks concurrently. Step 236 may specifically connect the various electrical contacts and position the pivot point in gimbaled contact with a load beam, however, such assembly is not required or limiting.

With the transducing head partly or completely assembled in step 236, step 238 next assembles a transducing actuator, like the actuating assembly 122 of FIG. 2. The transducing head may be attached in step 238 to a motorized source that allows movement from the inner diameter to the outer diameter of the surface of a data storage media. While not limited to a particular construction, the transducing actuator may be fabricated to provide a multitude of transducing heads on different portion, such as opposite sides, of the data storage media.

Regardless of the number and design of the transducing head and actuator, step 240 orients each actuator to predetermined portions of the data storage media. Step 240 may include at least the setting of the transducing actuator to establish zero skew angle, such as positioning the transducing head substantially in the middle between the inner and outer diameters of the data tracks.

Through the various steps of routine 230, it can be appreciated that a data element can be produced that is capable of concurrently reading data bits from adjacent data tracks to provide two dimensional data sensing. However, the routine 230 should be understood as not limiting as the various steps can be omitted, changed, and added.

The various structural and operational configurations of a data element provide hereinabove allows for at least two dimensional magnetic reading. Positioning the various data sensors symmetrically in relation to a pivot point allows the sensors to align with data tracks regardless of the skew angle of the transducing assembly. Such immunity to skew angle induced misalignment may be implemented to simultaneously access data from two or more data tracks with increased data sensing accuracy due at least in part to the size and alignment of the data sensors with respect to the adjacent data tracks. In addition, while the embodiments have been directed to magnetic sensing, it will be appreciated that the claimed technology can readily be utilized in any number of other applications.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. An apparatus comprising a transducing assembly positioned across an air bearing surface (ABS) from a data medium having a plurality of data bit arranged in first and second data tracks each having a first length along a common axis, the transducing assembly comprising a pivot point on the ABS disposed between first, second, and third read sensors configured to concurrently read two dimensional user data, the first and second read sensors having a second length along the common axis that is less than the first length and the third read sensor having a third length along the common axis that is greater than the first length.

2. The apparatus of claim 1, wherein each of the at least two read sensors reads from independent data tracks of a data storage media.

3. The apparatus of claim 2, wherein each data track of said independent data tracks has a common track width.

4. The apparatus of claim 3, wherein the common track width is approximately 50 nm.

5. The apparatus of claim 1, wherein the pivot point is on a common slider.

6. The apparatus of claim 5, wherein each of the plurality of read sensors is positioned on an air bearing surface of the common slider.

7. The apparatus of claim 1, wherein first and second read sensors of the plurality of read sensors are positioned on lateral sides of the pivot point.

8. The apparatus of claim 1, wherein the pivot point corresponds with a head gimbal assembly dimple.

9. The apparatus of claim 1, wherein the plurality of read sensors further comprises a third read sensor symmetric about a centerline that intersects the pivot point.

10. The apparatus of claim 1, wherein each read sensor of the plurality of read sensors is magnetoresistive.

11. An apparatus comprising a transducing assembly positioned across an air bearing surface (ABS) from a data medium having a plurality of data bit arranged in first and second data tracks each having a first length along a common axis, the transducing assembly comprising a pivot point on the ABS disposed between first, second, and third read sensors configured to concurrently read two dimensional user data, the first and second read sensors having a second length along the common axis that is less than the first length and the third read sensor having a third length along the common axis greater than the first length, the first, second, and third read sensors positioned symmetrically about a longitudinal line extending through the pivot point orthogonal to the common axis and positioned asymmetrically along the common axis extending through the pivot point.

12. The magnetic read element of claim 11, wherein the first, second, and third read sensors are positioned to engage separate data tracks of a data storage medium.

13. The magnetic read element of claim 11, further comprising a fourth read sensor disposed uptrack from and positioned symmetrically about the pivot point along the common axis and longitudinal line.

14. The magnetic read element of claim 11, wherein the third read sensor is positioned approximately twice the second length from the pivot point.

15. The magnetic read element of claim 11, wherein each of the first, second and third read sensors spans multiple data tracks while concurrently reading user data.

16. The magnetic read element of claim 11, wherein the pivot point is positioned to float over the midpoint of a data track during reading of user data.

17. A transducing head comprising:
   a slider configured to pivot about a pivot point and to be supported adjacent a data storage surface via an air bearing surface (ABS), the data storage surface having first, second, and third data tracks each having a first length along a common axis;
   first and second read sensors supported by the slider on opposite lateral sides of a longitudinal centerline that intersects the pivot point, the first and second read sensors each having a second length along the common axis that is less than the first length; and
   a third read sensor supported by the slider at a downtrack position that intersects the longitudinal centerline, the third read sensor partially overlapping at least a selected one of the first or second read sensors to concurrently read two dimensional user data, the third read sensor having a third length along the common axis greater than the first length.

18. The transducing head of claim 17, wherein the third length is 1.5 times greater than the first length.

19. The transducing head of claim 17, wherein the third read sensor continuously extends to cover portions of the first, second, and third data tracks.

20. The transducing head of claim 17, wherein the first read sensor spans portions of the first data track, the second read sensor spans portions of the second data track, and the third read sensor spans portions of the third data track.

* * * * *